United States Patent Office 3,586,736
Patented June 22, 1971

3,586,736
VINYL ETHER MODIFIED POLYPHENYLENE OXIDE

Toshio Takemura, Kamigyo-ku, Kyoto, Isamu Nakagawa, Sumiyoshi-ku, Osaka, and Seizo Nakashio, Nishinomiya-shi, Japan, assignors to Sumitomo Chemical Company, Ltd., Higashi-ku, Osaka, Japan
No Drawing. Filed June 5, 1969, Ser. No. 830,853
Claims priority, application Japan, June 7, 1968, 43/39,061
Int. Cl. C08f *29/30, 43/02*
U.S. Cl. 260—874 27 Claims

ABSTRACT OF THE DISCLOSURE

A novel modified polyphenylene oxide which is stable against thermal oxidation is prepared by contacting a vinyl ether compound with a Lewis acid in the presence of a polyphenylene oxide to polymerize the vinyl ether compound. Said reaction may be effected in the presence or absence of a reaction medium, such as aliphatic or alicyclic hydrocarbons or aromatic hydrocarbons or derivatives thereof. The reaction temperature is usually below 140° C. The amount of the Lewis acid is preferably 0.0001 to 10% by weight based on the total amount of the reaction mixture.

The present invention relates to a novel modified polyphenylene oxide, prepared by contacting a vinyl ether compound with a Lewis acid in the presence of a polyphenylene oxide to polymerize the vinyl ether compound.

Polyphenylene oxide is known as a resin excellent in thermal resistance, chemical resistance and mechanical and electrical properties. However, said polymer is poor in oxidation resistance when heated. In particular, when subjected to high temperatures in air or in the presence of oxygen, said polymer relatively quickly undergoes thermal oxidation, whereby coloration and reduction in strength and flowability are caused.

The present inventors have done extensive research on the cause of the deterioration of the polymer due to thermal oxidation and a process for preventing the deterioration to find that the thermal oxidation proceeds mainly through depolymerization caused by the free hydroxyl group present at the end of the polyphenylene oxide or through electron transfer based on removal of the hydrogen atom of the terminal hydroxyl group and that in the case of a polyphenylene oxide having oxidizable substituents, such as hydrocarbon groups, substituted hydrocarbon groups and alkoxy groups, at at least one position of the 2, 3, 5 and 6 positions, such substituents are partially oxidized during polymerization to be converted into hydroxyl and aldehyde or carboxyl groups and these groups result in the deterioration of the polymer due to thermal oxidation.

The present inventors have found that a polymer composition improved markedly in properties, particularly, color resistance against thermal oxidation and impact strength, is obtained by contacting a vinyl ether compound with a Lewis acid in the presence of a polyphenylene oxide to polymerize the vinyl ether compound.

Although it is not clear by what mechanism or mode the vinyl ether compound is connected to the polyphenylene oxide, there is a very great possibility of the former being graft-polymerized on the latter at the position of the above-mentioned hydroxyl groups. Further, even when a graft-copolymer is not formed, the vinyl ether compound may be bonded to the polyphenylene oxide to the extent that the former can uniformly be mixed with the latter.

The polyphenylene oxide to be modified in the present invention is represented by the general formlua:

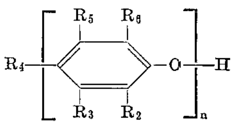

wherein $R_2$, $R_3$, $R_5$ and $R_6$ are hydrogen or halogen atoms or hydrocarbon, substituted hydrocarbon, cyano, alkoxy, phenoxy, nitro or amino alkyl groups, $R_4$ is a hydrogen or halogen atom and $n$ is an integer referring to the degree of polymerization and is a positive integer of at least 50.

Examples of $R_2$, $R_3$, $R_5$ and $R_6$ are hydrogen, chlorine, bromine, iodine, methyl, ethyl, propyl, allyl, phenyl, benzyl, methylbenzyl, chloromethyl, bromomethyl, cyanoethyl, cyano, methoxy, ethoxy, phenoxy, nitro, amino methyl and the like. Examples of $R_4$ are hydrogen, chlorine and iodine.

For example, the present polyphenylene oxides include poly-2,6-dimethyl-1,4-phenyleneoxide,
poly-2,6-diethyl-1,4-phenyleneoxide,
poly-2,6-dipropyl-1,4-phenyleneoxide,
poly-2-methyl-6-isopropyl-1,4-phenyleneoxide,
poly-2,6-dimethoxy-1,4-phenyleneoxide,
poly-2,6-dichloromethyl-1,4-phenyleneoxide,
poly-2,6-dibromomethyl-1,4-phenyleneoxide,
poly-2,6-diphenyl-1,4-phenyleneoxide,
poly-2,6-ditolyl-1,4-phenyleneoxide,
poly-2,6-dichloro-1,4-phenyleneoxide,
poly-2,5-dimethyl-1,4-phenyleneoxide, etc.

The vinyl ether compound to be polymerized in the presence of polyphenylene oxide according to the present invention is represented by the general formula, $$CH_2{=}CH{-}O{-}R$$

wherein R represents a hydrocarbon group or a substituted hydrocarbon group.

For example, the present vinyl ether compound includes vinylmethylether, vinylethylether, vinyl-n-propylether, vinyl-n-butylether, vinylisopropylether, vinylisobutylether, vinylphenylether, vinyl-p-tolylether, vinyl-p-nitrophenylether, vinyl - p - cyanophenylether, vinyl-p-chlorophenylether, vinyl - m - aminophenylether, vinylbenzylether, vinylchloromethylether, vinylcyanoethylether, divinylether, vinylallylether, vinylcyclohexylether, etc.

The amount of vinyl ether compound to be used for polymerization according to the present invention is not restricted.

A small amount of a Lewis acid is used as a catalyst in polymerizing the vinyl ether compound in the presence of the polyphenylene oxide.

The catalyst may be a Lewis acid alone or a complex of the Lewis acid with a suitable organic compound.

The present Lewis acid includes, for example, boron trifluoride, boron trifluoride-ether complex, boron trifluoride-acetic acid complex, boron trifluoride-methanol complex, boron trifluoride-phenol complex, boron trifluoride-triethanol amine complex, boron tribromide, boron trichloride, aluminum chloride, ferric chloride, ferric bromide, tin tetrachloride, zinc chloride, titanium tetrachloride, etc.

The amount of the catalyst to be used in the present invention is not particularly limited, a concentration of about 0.0001 to 10% by weight of the catalyst on the basis of total reaction mixture is preferable, but a concentration exceeding said range can be employed, if desired.

Polymerization reaction can be conducted by contacting vinyl ether compound with a Lewis acid in the presence of a polyphenylene oxide in the absence of a reaction medium. However, it is preferable to conduct polymerization reaction in the presence of a reaction medium because controlling the reaction conditions and treating the reaction product are easier. For instance, the polymerization reaction can be conducted by adding a vinyl ether compound to a solution obtained by dissolving the polymer in a solvent or by adding a vinyl ether compound to a polymerization reaction mixture containing the polymer. The selection of these prodedures depends upon the polymerization conditions for obtaining the polyphenylene oxide or those for the vinyl ether compound. As long as the reaction medium is inert to the polyphenylene oxide and the vinyl ether compound and liquid at the reaction temperature, any known reaction medium can be used. Even when a small amount of a medium which is active to the vinyl ether compound is present, there is no adverse effect on the present invention other than the vinyl ether composition being consumed to a certain extent by reaction with the active medium.

Examples of the reaction medium are aliphatic or alicyclic hydrocarbons, aromatic hydrocarbons and derivatives of said hydrocarbons, such as nitrated hydrocarbons, halogenated hydrocarbons or hydroxylated hydrocarbons, ethers, ketones, lactones, sulfonated hydrocarbons.

Specifically, heptane, benzene, toluene, monochlorobenzene, dichlorobenzene, nitrobenzene, methylclohexane, methyl alcohol, ethyl alcohol, butyl alcoho, methyl Cellosolve, methylene dichloride, ethylene dichloride, diethyl ether, tetrahydrofuran, dioxane, acetone, ethyl acetate, propiolactone, acetonitrile may commonly be used. The reaction medium is used in an amount by weight of 1–200 times, preferably 2–100 times, the amount of polyphenylene oxide.

A reaction temperature may freely be selected within the range which keeps the reaction medium liquid. However, a temperature of less than 140° C. is preferable in order to avoid side reactions.

The present invention provides an important benefit that a modified polyphenylene oxide composition which is stable against thermal oxidation and has high impact strength is obtained in high yield.

The following examples are given by way of specifically illustrating the invention and are not intended to be construed as limiting in any sense.

EXAMPLE 1

One hundred grams of poly-2,6-dimethyl-1,4-phenyleneoxide having an intrinsic viscosity of 0.72 dl./g. at 25° C. in chloroform were dissolved in 400 ml. of xylene, 6.4 g. of boron trifluoride-diethylether complex (content of boron trifluoride: 47%) and 19.8 g. of vinylisobutylether were added thereto, and the reaction was carried out under stirring at 70° C. for 5 hours. The obtained reaction mixture was added to about 2,000 ml. of methanol, and resulting precipitate was filtered, washed with methanol, washed with water and dried at 90° C. for 10 hours. 103.8 grams of modified polymer having an intrinsic viscosity of 0.63 dl./g. were obtained.

The content of polyvinylisobutylether in the modified polymer was found to be 5.6% by weight as a result of quantitative analysis using nuclear magnetic resonance spectrum.

The compounds of modified polyphenyleneoxide and unmodified polyphenyleneoxide were pressed at 100 kg./cm.$^2$ at 270° C. for 10 minutes to form sheets which colorings were examined. The sheet from modified polymer was not colored brown but colored milk white while that from unmodified polymer was colored brown.

The compounds of modified polyphenyleneoxide and unmodified polyphenyleneoxide respectively contained 1% by weight of a stabilizer of 2,6-ditert.-butyl-p-cresol were rolled at 270° C. for 7 minutes and pressed at 150 kg./cm.$^2$ at 250° C. to determine Sharpy Impact Value in accordance with JIS–6745 (Japanese Industrial Standard 6745). The value from modified polymer was 13.1 (notch kg./cm./cm.$^2$) and that from unmodified polymer was 4.1(notch kg./cm./cm.$^2$).

A film having a thickness of about 0.05 mm. formed from a chloroform solution was heated at 226° C. for 30 minutes in an oxygen atmosphere, and then extracted in chloroform for 10 hours by using Soxhlet's extractor. A ratio of the film weight after extraction to the film weight before extraction was determined to obtain a gel formation ratio.

The gel formation ratio of modified polymer was 40.5% while that of unmodified polymer was 90.3%.

EXAMPLE 2

5.0 grams of poly-2,6-dimethyl-1,4-phenyleneoxide having an intrinsic viscosity of 0.72 dl./g. measured in chloroform at 25° C. was dissolved in 100 ml. of xylene. To thus obtained solution, 0.032 g. of boron trifluoride diethyl ether complex (containing 47% of boron trifluoride) and 2.0 g. of vinyl isobutylether were added and they were reacted at 100° C. for 5 hours while stirring. Thus obtained reaction mixture was introduced into about 500 ml. of methanol and the precipitate produced was filtered and washed. Thereafter, the precipitate was dried at 90° C. for 10 hours. As the result, 5.05 g. of a modified polymer was obtained.

The content of polyvinylisobutylether in the modified polymer was estimated from nuclear magnetic resonance spectrum in a duterated chloroform solution of the polymer.

The results obtained were shown in the following table and the content of polyvinylisobutylether in the polymer calculated from the table was 5.7% by weight.

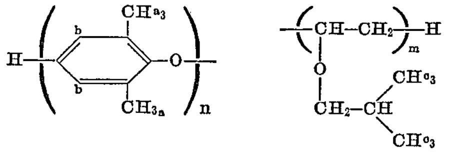

| | 2 value | Integral value |
|---|---|---|
| a--- Hydrogen (s) | 8.06 | 42.5 |
| b---do | 3.61 | 14.1 |
| c--- Hydrogen (d) | 9.20 | 3.1 |

The modified polymer and unmodified polymer were pressed under 100 kg./cm.$^2$ at 270° C. for 10 minutes into sheets of 1 mm. in thickness, respectively. Comparison of the two sheets regarding coloration showed that the sheet produced from the unmodified polymer colored brown, while the sheet from the modified polymer did not color brown, but assumed milk white and showed increased elasticity.

Also, the film which was formed from chloroform solution and has a thickness of about 0.05 mm. was heated at 226° C. for 30 minutes in an oxygen atmosphere and then subjected to extraction for 10 hours in chloroform by using Soxhlet's extractor.

A ratio of film weight after extraction to that before extraction was determined as a gel formation ratio. The gel formation ratio of modified polymer was 41.0% while that of unmodified polymer was 91.3%.

EXAMPLE 3

Five grams of poly-2,6-dimethyl-1,4-phenyleneoxide was dissolved in 100 ml. of xylene, 0.05 g. of tin tetrachloride and 1.0 g. of vinylphenylether were added thereto, and the mixture was reacted at 70° C. for 5 hours under stirring.

The resulting mixture was treated as in Example 1 to obtain 5.12 g., of modified polymer.

A sheet was formed through press as in Example 1. The sheet from the modified polymer was not colored brown but milk-white and the elasticity thereof has been much increased, while the sheet from the unmodified polymer was colored brown.

The gel formation ratio of the modified polymer was 44.1%.

EXAMPLES 4 TO 6

In 400 ml. of xylene was dissolved 100 g. of poly-2,6-dimethyl-1,4-phenyleneoxide, and a catalyst and a vinyl ether compound were added to the resulting solution. The resulting mixture was heated, with stirring, at a given temperature for a given period of time. The resulting reaction mixture was treated in the same manner as in Example 1 to obtain a modified polymer. This polymer was subjected to a thermal oxidation test by means of a press in the same manner as in Example 1 to find that a sheet from unmodified polymer was browned, while every sheet from the modified polymer was little colored and opaque. In the same manner as in Example 1, the impact strengths and gel formation ratio of the samples were determined. The reaction conditions and the results obtained were as follows:

| Example No. | Vinyl ether | G. | Catalyst | G. | Reaction temp. (° C.) | Reaction time (hr.) | Intrinsic viscosity (dl./g.) Before reaction | After reaction | Yield (g.) | Charpy impact value (notch kg.-cm./cm.²) | Gel formation ratio (percent) |
|---|---|---|---|---|---|---|---|---|---|---|---|
| 4 | Ethyl vinyl ether | 20.0 | Boron trifluoride-diethyl ether complex. | 7.0 | 70 | 5 | 0.75 | 0.70 | 108.2 | 12.1 | 43.1 |
| 5 | n-Butyl vinyl ether | 15.0 | Boron trifluoride-phenol complex. | 5.0 | 70 | 5 | 0.81 | 0.65 | 105.1 | 10.5 | 43.9 |
| 6 | Phenyl vinyl ether | 20.0 | Boron trifluoride gas | (1) | 60 | 7 | 0.70 | 0.64 | 103.9 | 13.1 | 48.1 |

1 Not measured.

EXAMPLES 7 TO 9

The same procedure as in Example 2 was repeated except that the phenylene oxide shown hereunder was substituted for the poly-2,6-dimethyl-1,4-phenyleneoxide, and the reaction temperature was 70° C. A polymer obtained was pressed in the same manner as in Example 2. Every pressed sheet was milk white and had an increased elasticity.

| Ex. No. | Polyphenylene oxide | Intrinsic viscosity (dl./g.) Before reaction | After reaction | Yield (g.) |
|---|---|---|---|---|
| 7 | Poly-2,6-dichloro-1,4-phenyleneoxide. | 0.51 | 0.51 | 5.27 |
| 8 | Poly-2,6-diallyl-1,4-phenyleneoxide. | 0.55 | 0.52 | 5.18 |
| 9 | Poly-2,6-dimethoxy-1,4-phenyleneoxide. | 0.62 | 0.59 | 5.24 |

We claim:

1. A process for the modification of polyphenylene oxides which comprises polymerizing a vinyl ether having the formula:

$$CH_2{=}CH{-}OR$$

wherein

R is an unsubstituted hydrocarbon radical or hydrocarbon substituted by nitro, cyano, chloro, or amino, in the presence of a polyphenylene oxide having the formula:

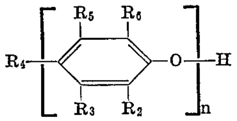

wherein

*n* is a positive integer and is at least 50; each of $R_2$, $R_3$ $R_5$ and $R_6$ is independently hydrogen, halogen, unsubstituted hydrocarbon or hydrocarbon substituted by halo or cyano, cyano, alkoxy, phenoxy, nitro or aminoalkyl; and $R_4$ is hydrogen or halogen;

using a Lewis acid as the polymerizing catalyst.

2. A process of claim 1, wherein at least one of $R_2$ and $R_6$ is alkyl.

3. A process of claim 1, wherein said polyphenylene oxide is a poly-2,6-dimethyl-1,4-phenyleneoxide.

4. A process of claim 1, wherein at least one of $R_2$ and $R_6$ is methoxy.

5. A process of claim 1, wherein at least one of $R_2$ and $R_6$ is allyl.

6. A process of claim 1, wherein at least one of $R_2$ and $R_6$ is chlorine.

7. A process of claim 1, wherein said hydrocarbon radical contains 1 to 20 carbon atoms.

8. A process according to claim 1, wherein said vinyl ether is vinylisobutylether.

9. A process of claim 1, wherein said vinyl ether is vinyl-n-butylether.

10. A process of claim 1, wherein said vinyl ether is vinylethylether.

11. A process of claim 1, wherein said vinyl ether is vinylphenylether.

12. A process of claim 1, wherein said Lewis acid is boron trifluoride.

13. A process of claim 1, wherein said Lewis acid is a boron trifluoride complex.

14. A process of claim 1, wherein said Lewis acid is a boron trifluoride-diethylether complex.

15. A process of claim 1, wherein said Lewis acid is a boron trifluoride-phenol complex.

16. A process of claim 1, wherein said Lewis acid is tin tetrachloride.

17. A modified polyphenylene oxide prepared by polymerizing a vinyl ether having the formula:

$$CH_2{=}CH{-}OR$$

wherein

R is an unsubstituted hydrocarbon radical or hydrocarbon substituted by nitro, cyano, chloro or amino, in the presence of a polyphenylene oxide having the formula:

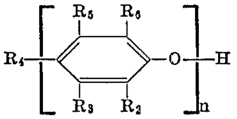

wherein

*n* is a positive integer and is at least 50; each of $R_2$, $R_3$, $R_5$ and $R_6$ is independently hydrogen, halogen, unsubstituted hydrocarbon or hydrocarbon substituted by halo or cyano, cyano, alkoxy, phenoxy, nitro or aminoalkyl; and $R_4$ is hydrogen or halogen;

using a Lewis acid as the polymerizing catalyst.

18. An oxide of claim 17, wherein at least one of $R_2$ and $R_6$ is alkyl.

19. An oxide of claim 17 wherein said polyphenylene oxide is a poly-2,6-dimethyl-1,4-phenyleneoxide.

20. An oxide of claim 17, wherein at least one of $R_2$ and $R_6$ is methoxy.

21. An oxide of claim 17, wherein at least one of $R_2$ and $R_6$ is allyl.

22. An oxide of claim 17, wherein at least one of $R_2$ and $R_6$ is chlorine.

23. An oxide of claim 17, wherein said hydrocarbon radical contains 1 to 20 carbon atoms.

24. An oxide of claim 17, wherein said vinyl ether is vinylisobutylether.

25. An oxide of claim 17, wherein said vinyl ether is vinyl-n-butylether.

26. An oxide of claim 17, wherein said vinyl ether is vinylethylether.

27. An oxide of claim 17, wherein said vinyl ether is vinylphenylether.

References Cited

UNITED STATES PATENTS 3,356,761 12/1967 Fox ---------------- 260—874

FOREIGN PATENTS 22,069 10/1967 Japan ---------------- 260—874

SAMUEL H. BLECH, Primary Examiner

U.S. Cl. X.R.

260—45.95, 47 ET